United States Patent [19]

Chang

[11] 4,166,142

[45] Aug. 28, 1979

[54] PROCESS CHEESE CONTAINING A MODIFIED WHEY SOLIDS

[75] Inventor: Pei K. Chang, Montrose, N.Y.

[73] Assignee: Stauffer Chemical Company, Westport, Conn.

[21] Appl. No.: 818,645

[22] Filed: Jul. 25, 1977

Related U.S. Application Data

[63] Continuation of Ser. No. 707,990, Jul. 23, 1976, abandoned, which is a continuation of Ser. No. 573,501, May 1, 1975, abandoned, which is a continuation-in-part of Ser. No. 546,635, Feb. 3, 1975, abandoned.

[51] Int. Cl.² ............................................. A23C 19/12
[52] U.S. Cl. .................................. 426/582; 426/583
[58] Field of Search ................ 426/580, 582, 583, 41

[56] References Cited

U.S. PATENT DOCUMENTS

| | | | |
|---|---|---|---|
| 3,337,347 | 8/1967 | Kichline et al. | 426/582 |
| 3,560,219 | 2/1971 | Attebery | 426/583 X |
| 3,930,056 | 12/1975 | Feminella et al. | 426/583 X |
| 4,036,999 | 7/1977 | Grindstaff | 426/583 X |

FOREIGN PATENT DOCUMENTS

5140 of 1922 Australia.

OTHER PUBLICATIONS

Kosikomski, F., Cheese and Fermented Milk Foods, Published by the Author, Cornell University, Ithaca, N.Y. 1966 (pp. 295 & 296).

Webb, et al., By Products from Milk, 2nd Ed., The Ain Publishing Co., Inc., Westport, Conn. 1970 (pp. 160-163, 169-176 & 407).

*Primary Examiner*—David M. Naff
*Attorney, Agent, or Firm*—Paul J. Juettner

[57] ABSTRACT

Pasteurized process cheese, pasteurized process cheese food and spread, and imitation cheese spread products are disclosed which contain a partially soluble modified whey solids product derived from either adding a divalent metal ion to a cheese whey solution and adjusting the pH to between about 6.0 and about 8.0 at a temperature of below about 140° F. or by adjusting the pH of a raw cheese whey containing at least 20% acid cheese whey to a value of between about 6.0 and about 8.0 to cause precipitation of the modified whey solids product.

8 Claims, No Drawings

PROCESS CHEESE CONTAINING A MODIFIED WHEY SOLIDS

CROSS REFERENCES TO RELATED APPLICATIONS

The present application is a continuation of Ser. No. 707,990, filed July 23, 1976 (now abandoned) which in turn was a continuation of application Ser. No. 573,501, filed May 1, 1975 (now abandoned), which in turn was a continuation-in-part of Ser. No. 546,635, filed Feb. 3, 1975 (now abandoned).

TECHNICAL DESCRIPTION OF THE INVENTION

The present invention relates to a cheese product containing a partially soluble modified whey solids product. As used herein the term "cheese product" is meant to include pasteurized process cheese, pasteurized process cheese food and spread, and imitation cheese spread products which are all well known in the art, e.g., see Webb et al., Fundamentals of Dairy Chemistry, Chapter 2, AVI Publishing Co., Westport, Conn. (1965).

Pasteurized process cheese, as defined in 21 C.F.R. § 19.750, contains a blend of fresh and aged natural cheeses and up to about 3% cheese emulsifier. The blend is pasteurized at about 155°–160° F., is packaged and is cooled, after which no further ripening occurs. If desired, a number of optional ingredients including coloring, salt, and preservatives can be added. A typical composition will have a minimum fat content, based upon total solids, of about 47% by weight and a maximum moisture content of about 40% by weight. The minimum pH will be about 5.3. A recent U.S. patent which further describes this type of cheese is U.S. Pat. No. 3,697,292 to R. M. Lauck.

Pasteurized process cheese food, as defined in 21 C.F.R. §19.765, is prepared much the same way as the pasteurized process cheese except that it contains less cheese with either nonfat dry milk solids and/or whey solids, and added water. The processing temperature is from about 170° to about 180° F., and a typical product has a maximum moisture content of about 44% by weight, a minimum fat content of about 23%, by weight, based on the weight of the final cheese, and a minimum pH of about 5.0. This product is generally sold in sliced form.

Pasteurized process cheese spread, as defined in 21 C.F.R. § 19.775, is made in much the same manner as the pasteurized process cheese food but it generally contains more moisture and has a lower milk fat content. A stabilizer such as carob bean gum or sodium alginate is used in the preparation of this product to prevent separation of ingredients. It is usually processed at about 185° to about 195° F., has a moisture content of about 44–60%, by weight, a minimum fat content of about 20%, by weight, based on the weight of the final product, and a minimum pH of about 4.0. It is generally sold in loaf form.

Imitation cheese spread, which has no governmental standard of identify, generally comprises about 5–30% vegetable oil, about 35–60% protein and about 2.5–70% water. An example of such a product is described in U.S. Pat. No. 3,310,406.

It has been found that the above cheese products can have added to them the partially soluble modified whey solids product, which will be described in greater detail below, to yield a product having improved physical properties. The amount of modified whey solids product should be between about 1% and 12%, by weight of the cheese product, as either a partial replacement for the expensive non-fat dry milk solids or as a total replacement for the conventional whey products used in the pasteurized process cheese food or spread. A preferred range for partial replacement of the non-fat dry milk is from about ½ to about ⅔ of the amount of non-fat dry milk normally used. When the desired product is an imitation cheese, the amount of whey product to be used in this invention can range from about 1% to about 20% by weight of the product.

The partially soluble modified whey solids product suitable for use in the present invention can be formed by either the process described in U.S. Pat. No. 3,560,219 to J. M. Attebery or the process described in copending U.S. Serial No. 502,262, filed Aug. 30, 1974 of D. A. Grindstaff. This product will have the following typical analysis: Lactose: 23–54% by weight; Minerals: 24–60% by weight; Protein (Nx6.38): 15–27% by weight; Moisture: 3–6% by weight; Lactate: about 2–4% by weight; Citrate: about 2–3.5% by weight; and Fat: about 0.5–1.5% by weight. A typical mineral or ash content, by weight, is 3 to 6% phosphorus, 6 to 12% calcium; 1.5 to 2% potassium; 1.3 to 1.5% sodium; and 0.2 to 0.4% magnesium. The product contains a calcium phosphate-protein complex and is available from Stauffer Chemical Co., Food Ingredients Division, Westport, Connecticut.

The process for forming this product by means of the above-mentioned Attebery patent comprises adding an effective amount of a divalent metal ion, such as calcium, to a cheese whey solution and adjusting the pH to a value between about 6 and about 8.5 at a temperature below about 140° F. to produce the desired product as a precipitate.

The process for forming the product used in the present invention by means of the above-mentioned copending Grindstaff application comprises adjusting the pH of raw cheese whey containing at least 20% acid cheese whey to a value of between about 6.0 and about 8.0 by the addition of base to cause precipitation of the desired product.

The above-described modified whey solids product can be used with any of the well-known emulsifiers for the cheese products described herein in an effective amount for emulsification. The amount should be from about 1% to 3% by weight, and those emulsifiers which can be used are at least one from the following group: monosodium phosphate, disodium phosphate, dipotassium phosphate, trisodium phosphate, sodium acid pyrophosphate, tetrasodium pyrophosphate, sodium metaphosphate(sodium hexametaphosphate), sodium aluminum phosphate(kasal), sodium citrate, potassium citrate, calcium citrate and sodium potassium tartrate. An especially preferred emulsifier is a mixture of sodium aluminum phosphate, basic, and one of the above-named citrate emulsifiers, especially sodium citrate, in a weight ratio of from about 5:1 to about 1:5.

The following Examples illustrate certain preferred embodiments of the invention. All samples of the partially soluble modified whey solids product were formed according to the procedure set forth in the copending Grindstaff application that was mentioned above.

EXAMPLE 1

Two cheese food batches were made having the following ingredients:

Table 1

| Ingredient | % Formula I | % Formula II |
| --- | --- | --- |
| Cheddar Cheese (6 mos. old) | — | 19.4 |
| Cheddar Cheese (2–3 weeks old) | 69 | 51.5 |
| Non-Fat Dry Milk Solids (NFDM) | 10 | — |
| Whey Solids (Krafen ®, sold by Kraft Co.) | — | 6.7 |
| Insoluble sodium metaphosphate: trisodium phosphate emulsifier (60 : 40)-Kasomet™ 11 | 1.8 | 1.8 |
| Sodium aluminum phosphate basic (kasal) | 1.2 | 1.2 |
| Salt | 0.5 | 0.9 |
| Heavy Cream | 0.13 | 2.1 |
| Citric Acid | 0.03 | 0.02 |
| Potassium Sorbate | 0.02 | 0.01 |
| Water | 17.32 | 16.37 |

The cheddar cheese, emulsifiers, dissolved whey solids, non-fat dry milk solids and heavy cream in water, and then citric acid and potassium sorbate were added to the bowl of a Brabender Plastograph which had been preheated to 190° F. The water was added (16–17%) to reach a moisture content of about 44%. About 5% of the water was added as steam during the entire process period. The mixing was at 150 envelopes/min. for 3 min., and the product had a final temperature of about 173° F. The cheese was then sheeted inside saran wrap into 2/10 inch slices and was cooled and stored in a refrigerator at 50° C. Both showed a slight amount of fat loss.

Two other formulations, called IA and IIA, were made exactly as outlined above except for the use of a partially soluble modified whey solids product available from Stauffer Chemical Company as a replacement for the NFDM and whey solids product. The pre-dissolving of the partially soluble modified whey solids product in water enhanced the dispersability in cheese of the whey during processing thereby giving a product having better emulsification properties. Neither showed any fat loss.

EXAMPLE 2

The same basic formulation described in Example 1 was made with variations in the protein fraction (NFDM or the whey product for use with this invention) and in the % content of emulsifier, i.e. a 40:60 weight ratio of kasal and Kasomet TM 11. The Table sets forth the results:

Table 2

| Protein (10%) | Total Emulsifier % | Fat Stabilization*** |
| --- | --- | --- |
| NFDM* | 3 | 2 |
| NFDM* | 2.5 | 2 |
| Partially soluble modified whey solids | 3 | 5 |
| Partially soluble modified whey solids | 2.5 | 5 |
| Partially soluble modified whey solids | 2.0 | 5 |
| Partially soluble modified whey solids | 1.0 | 1.5 |
| Partially soluble modified whey solids ENR-EX ®** (50 : 50) | 3 | 5 |

*Control
**ENR-EX ® is commercially available from Stauffer Chemical Company and is the low molecular weight fraction derived from processing cheese whey by a molecular sieve resin in accordance with U.S. Reissue Pat. No. 27,806. It comprises about 40–50% lactose, 25–35% minerals, and 15–20% protein (N × 6.38).
***Ascertained by visual inspection. 5 = no fat loss; 4 = trace fat loss; 3 = very slight fat loss; 2 = slight fat loss; 1 = moderate fat loss; 0 = appreciable fat loss.

EXAMPLE 3

Another cheese formulation was formed as described in Example 1 containing the following ingredients:

Table 3

| Ingredients | Amount (%) |
| --- | --- |
| Cheddar cheese (2–3 weeks old) | 69 |
| NFDM* | 10 |
| Sodium aluminum phosphate | 2.5 |
| Sodium citrate | 0.5 |
| Salt | 0.5 |
| Heavy cream | 0.13 |
| Citric acid | 0.17–0.34 |
| Potassium sorbate | 0.02 |
| Water | 17 |

*control in the Table given below. To be replaced with other protein products.

Table 3A

| Protein | Brabender Unit$^a$ Consistency | % Melt$^b$ Initial | % Melt$^b$ 4 Week | Hardness$^c$ Initial | Hardness$^c$ 4 Week | Fat Loss$^d$ | Smoothness$^d$ | Break$^d$ | Resilience$^d$ |
| --- | --- | --- | --- | --- | --- | --- | --- | --- | --- |
| NFDM (control) | 220 | 119 | 98 | 163 | 195 | 5 | 4 | 3 | 3 |
| Partially soluble modified whey solids | 160 | 117 | 109 | 205 | 216 | 5 | 3 | 3 | 3 |
| Partially soluble modified whey solids/ENR-EX ®* (50 : 50) | 190 | 107 | 118 | 197 | 216 | 5 | 3 | 3 | 3 |

*ENR-EX ® is commercially available from Stauffer Chemical Company.
$^a$Units on a chart furnished with the Brabender plastograph. Similar numbers inidcate similar consistencies.
$^b$Melt is evaluated by measuring the % increase in size of a 1/5" thick and 13/15" diameter cheese plug when heated in a 450° F. oven for three minutes. A reading of 60–120 is acceptable.
$^c$Hardness is evaluated as the distance (in 1/10 mm units) of penetration into overlapped cheese slices in 10 seconds by a penetrometer cone loaded with 20g. Higher numbers indicate a softer cheese product. A reading of about 160–220 is acceptable.
$^d$Subjective evaluation with 5 indicating the most desirable and 0 the least.

The above Examples illustrate certain preferred embodiments of the present invention. The appended claims set forth the protection that is requested.

What is claimed:

1. A cheese product which comprises, in admixture, a cheese composition selected from the group consisting of process cheese, process cheese food, process cheese spread, and imitation process cheese spread; a cheese emulsifier in an amount ranging from about 1% to about 3%, by weight, of the cheese product, said emulsifier consisting essentially of a mixture of sodium aluminum phosphate and a citrate selected from the group consisting of sodium citrate, potassium citrate, and calcium citrate in a weight ratio of sodium aluminum phosphate to citrate ranging between about 5:1 and about 1:5; and a partially soluble modified whey solids product derived from a process selected from the group consisting of (1) adding a divalent metal ion to a cheese whey solution and adjusting the pH to a value between about 6 and about 8.5 at a temperature of below 140° F. to cause precipitation of the modified whey solids product and (2) adjusting the pH of a raw cheese whey containing at least 20% acid cheese whey to a value of between about 6.0 and about 8.0 to cause precipitation of the modified whey solids product, said whey product comprising from about 1% to about 20%, by weight, of said cheese product said modified whey solids product comprising about 23-54% lactose, about 24-60% minerals, about 15-27% protein, about 3-6% moisture, about 2-4% lactate, 2-3.5% citrate and 0.5-1.5% of fat wherein said minerals includes about 3-6% phosphorus, about 6-12% calcium, about 1.5-2% potassium, about 1.3-1.5% sodium and about 0.2-0.4% magnesium by weight.

2. A cheese product as claimed in claim 1 wherein said whey product comprises about 1% to about 12%, by weight, of the cheese product which is selected from the group consisting of pasteurized process cheese, pasteurized process cheese food or pasteurized process cheese spread.

3. A cheese product as claimed in claim 1 wherein said citrate is sodium citrate.

4. A cheese product as claimed in claim 1 wherein said modified whey solids product is formed by adjusting the pH of raw cheese whey containing at least 20% acid cheese whey to a value of between about 6.5 and about 8.0 to cause precipitation of said modified whey solids product.

5. A method for preparing a cheese product comprising, in admixture, a cheese composition selected from the group consisting of process cheese, process cheese food, process cheese spread, and imitation process cheese spread; and a partially soluble modified whey solids product derived from a process selected from the group consisting of (1) adding a divalent metal ion to a cheese whey solution and adjusting the pH to a value between about 6 and about 8.5 at a temperature of below about 140° F. to cause precipitation of the modified whey solids product and (2) adjusting the pH of a raw cheese whey containing at least 20% acid cheese whey to a value of between about 6.0 and about 8.0 to cause precipitation of the modified whey solids product, said whey product comprising from about 1% to about 20%, by weight, of said cheese product, said modified whey solids product comprising about 23-54% lactose, about 24-60% minerals, about 15-27% protein, about 3-6% moisture, about 2-4% lactate, 2-3.5% citrate, and 0.5-1.5% fat wherein said minerals includes about 3-6% phosphorus, about 6-12% calcium, about 1.5-2% potassium, about 1.3-1.5% sodium and about 0.2-0.4% magnesium by weight, said method comprising emulsifying said cheese composition and said modified whey solids with an emulsifyingly effective amount of a cheese emulsifier consisting essentially of a mixture of sodium aluminum phosphate, basic, and a citrate, selected from the group consisting of sodium citrate, potassium citrate and calcium citrate wherein the weight ratio of said aluminum phosphate, basic, to said citrate ranges between about 5:1 to 1:5.

6. The method as claimed in claim 5 wherein said whey product comprises about 1% to about 12%, by weight, of the cheese product selected from the group consisting of pasteurized process cheese, pasteurized process cheese food or pasteurized process cheese spread.

7. The method as claimed in claim 5 wherein said citrate is sodium citrate.

8. The method as claimed in claim 5 wherein said modified whey solids product is formed by adjusting the pH of raw cheese whey containing at least 20% acid cheese whey to a value of between about 6.5 and about 8.0 to cause precipitation of said modified whey solids product.

* * * * *